United States Patent
Daum et al.

[15] 3,673,210
[45] June 27, 1972

[54] N-(ω-CYANO-ALKYL)-CARBAMYL-BENZIMIDAZOLES

[72] Inventors: Werner Daum, Krefeld-Bockum; Hans Schienpflug; Paul-Ernst Frohberger, both of Leverkusen; Ferdinand Grewe, Burscheid, all of Germany

[73] Assignee: Farbenfabriken Bayer Aktiengesellschaft, Leverkusen, Germany

[22] Filed: Nov. 26, 1969

[21] Appl. No.: 880,399

[30] Foreign Application Priority Data

Nov. 30, 1968 Germany .......................P 18 12 005.3

[52] U.S. Cl. ..................260/309.2, 260/465.1, 260/465.4, 260/465.5 R, 424/273
[51] Int. Cl. .........................................................C07d 49/38
[58] Field of Search ...............................................260/309.2

[56] References Cited

UNITED STATES PATENTS

| | | | |
|---|---|---|---|
| 3,336,191 | 8/1967 | Craig et al. | 260/309.2 |
| 3,399,212 | 8/1968 | Hoover et al. | 260/309.2 |
| 3,541,213 | 11/1970 | Klopping | 260/309.2 |

*Primary Examiner*—Natalie Trousof
*Attorney*—Burgess, Dinklage & Sprung

[57] ABSTRACT

N-(ω-cyano-alkyl)-carbamyl-benzimidazoles, i.e., 2-(optionally alkoxy-carbonyl and alkyl-carbonyl)-3-[N-(ω-cyano-alkyl)-carbamyl]-4,5,6 and/or 7-(optionally alkyl)-benzimidazoles, which possess fungicidal, anti-bacterial, insecticidal, acaricidal and ovicidal properties and which may be produced by conventional methods.

11 Claims, No Drawings

N-(ω-CYANO-ALKYL)-CARBAMYL-BENZIMIDAZOLES

The present invention relates to and has for its objects the provision for particular new N-(ω-cyano-alkyl)-carbamyl-benzimidazoles, i.e., 2-(optionally alkoxy-carbonyl and alkyl-carbonyl)-3-[N-(ω-cyano-alkyl)-carbamyl]-4,5,6 and/or 7-(optionally alkyl)-benzimidazoles, which possess fungicidal, anti-bacterial, insecticidal, acaricidal and ovicidal properties, active compositions in the form of mixtures of such compounds with solid and liquid dispersible carrier vehicles, and methods for producing such compounds and for using such compounds in a new way especially for combating fungi, bacteria, arthropods, e.g. insects and acarids, and the corresponding arthropod egg stages, with other and further objects becoming apparent from a study of the within specification and accompanying examples.

It is known that trichloromethylmercapto compounds, particularly N-trichloromethylthio-tetrahydrophthalimide (A), can be used as fungicidally active compounds (cf. German Pat. No. 921,290).

It has now been found, in accordance with the present invention, that the particular new N-(ω-cyano-alkyl)-carbamyl-benzimidazoles of the tautomeric formulas (I):

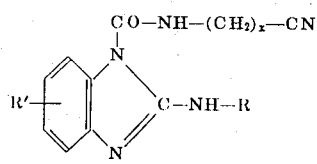

and

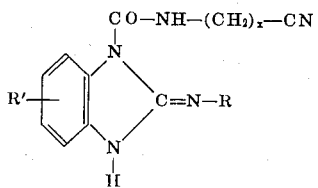

in which
R is hydrogen, alkoxycarbonyl having two to five carbon atoms or alkylcarbonyl having one to five carbon atoms,
R' is hydrogen or alkyl of one to four carbon atoms, and
$x$ is a whole number from 1 to 11, exhibit strong fungitoxic and anti-bacterial properties, and possess insecticidal, acaricidal and ovicidal properties as well.

It has been furthermore found, in accordance with the present invention, that the particular new compounds of formulas (I) above may be produced by the process which comprises a reacting a benzimidazole of the formula:

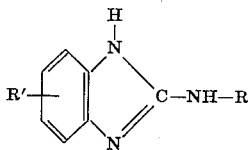

in which
R and R' are the same as defined above, with a cyanoalkyl-isocyanate of the formula:

$$OCN-(CH_2)_x-CN \qquad (III)$$

in which
$x$ is the same as defined above,
or
b reacting a benzimidazole of formula (II) above with a cyanoalkyl-carbamic acid chloride of the formula:

$$Cl-CO-NH-(CH_2)_x-CN \qquad (IV)$$

in which
$x$ is the same as defined above,
or c reacting a benzimidazole of formula (II) above with phosgene and then reacting the resulting chloroformyl-benzimidazole of the formula:

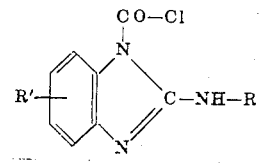

in which
R and R' are the same as defined above, with a cyanoalkyl amine of the formula:

$$H_2N-(CH_2)_x-CN \qquad (VI)$$

in which
$x$ is the same as defined above.

Surprisingly, the active compounds of formula (I) above according to the present invention show a higher fungitoxic effectiveness than the previously known compounds of analogous structure and the same type of activity such as N-trichloromethylthio-tetrahydrophthalimide (A) mentioned above. Furthermore, the instant compounds are also systemically effective. In addition, the instant compounds also possess significant insecticidal, acaricidal and ovicidal properties. The active compounds according to the present invention therefore represent a valuable contribution to the art.

Advantageously, in accordance with the present invention, in the various formulas herein:
R represents
 hydrogen;
 alkoxy carbonyl, i.e. carboalkoxy, having two to five carbon atoms such as methoxy, ethoxy, n- and iso-propoxy, n-, iso-, sec.- and tert.-butoxy, and the like, -carbonyl, i.e., $C_{1-4}$ alkoxy—$\overset{O}{\underset{\|}{C}}$— or carbo—$C_{1-4}$ alkoxy, especially $C_{2-4}$ or $C_{2-3}$ alkoxy-carbonyl, i.e., $C_{1-3}$ or $C_{1-2}$ alkoxy—C—; or alkylcarbonyl, i.e., alkanoyl, having one to five carbon atoms such as formyl, and methyl, ethyl, n- and iso-propyl, n-, iso-, sec.- and tert.-butyl, and the like, -carbonyl, i.e., formyl and $C_{1-4}$ alkyl—$\overset{O}{\underset{\|}{C}}$— or $C_{1-5}$ alkanoyl, especially $C_{2-5}$ or $C_{2-4}$ or $C_{2-3}$ alkylcarbonyl, i,e, $C_{1-3}$ or $C_{1-2}$ alkyl—$\overset{O}{\underset{\|}{C}}$—;

R' represents
 hydrogen;
 straight and branched chain lower alkyl hydrocarbon of one to four carbon atoms such as methyl, ethyl, n- and iso-propyl, n-, iso-, sec.- and tert.-butyl, and the like, i.e. in 4-, 5-, 6- or 7-nuclear position of the benzo moiety, especially $C_{1-3}$ or $C_{1-2}$ alkyl, more especially 5- and 7- nuclear position $C_{1-3}$ or $C_{1-2}$ alkyl, and most especially 5- and 7- nuclear position methyl; and
$x$ represents
 a whole number from 1–11, i.e., from 1 or 2 or 3 or 4 or 5 up to 11, especially 5–11.

Preferably, R is hydrogen; or $C_{2-4}$ alkoxycarbonyl, i.e., carbo-$C_{1-3}$ alkoxy; or $C_{2-4}$ alkylcarbonyl, i.e., $C_{2-4}$ alkanoyl; R' is hydrogen; or $C_{1-3}$ alkyl; and $x$ is a whole number from 5–11.

In particular, R is hydrogen; or $C_{2-3}$ alkoxycarbonyl, i.e., carbo-$C_{1-2}$ alkoxy; or $C_{2-3}$ alkylcarbonyl, i.e., $C_{2-3}$ alkanoyl; R' is hydrogen; or methyl, such as 5- and 7-methyl; and $x$ is 5–11.

If N-(benzimidazol-2-yl)-carbamic acid ethyl ester and ω-isocyanato-caproic acid nitrile are used according to process variant (a) as starting materials, the reaction course is represented by the following formula scheme:

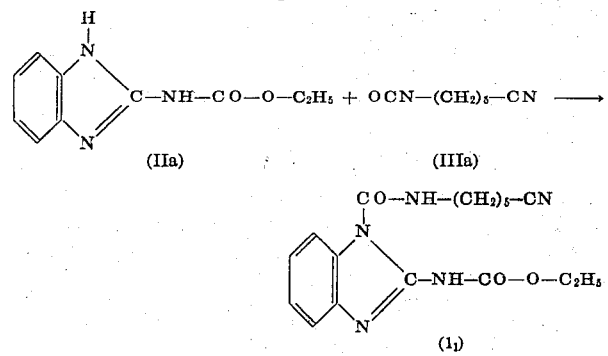

In process variant (b), the corresponding reaction course, with the splitting off of HCl, is represented by the following formula scheme:

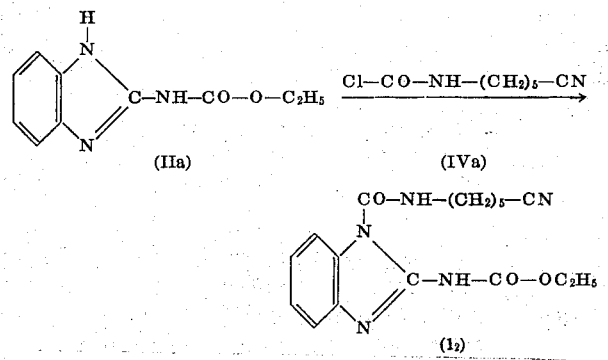

In variant (c) the corresponding reaction course, also involving in each instance the splitting off of HCl, is represented by the following formula scheme:

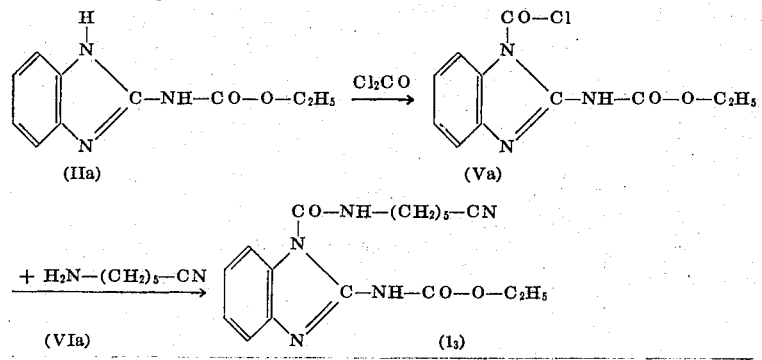

The starting materials which may be used are clearly characterized by formulas (II), (III), (IV) and (VI) above, with formula (V) designating an appropriate intermediate.

A list of examples of the benzimidazole starting materials of formula (II) above which may be reacted includes:
2-amino-benzimidazole;
4-methyl, 4-ethyl, 4-n-propyl, 4-iso-propyl-, 4-n-butyl-, 4-isobutyl-, 4-sec.-butyl-, 4-tert.-butyl, and the like, -2-amino-benzimidazole; 5-methyl-, 5-ethyl-, 5-n-propyl, 5-isopropyl-, 5-n-butyl-, 5-isobutyl-, 5-sec.-butyl-,5-tert.-butyl-, and the like, -2-amino-benzimidazole;
N-(benzimidazol-2-yl)-carbamic acid methyl ester, -ethyl ester, -propyl ester, -iso-propyl ester, -n-butyl ester, -iso-butyl ester, -sec.-butyl ester, tert.-butyl ester, and the like;
2-(formyl-amino)-, 2-(acetyl-amino)-,2-(propionyl-amino)-, 2-(butanoyl-amino)-, 2-(isobutanoyl-amino)-, and the like, benzimidazole;
N-(4- or 5-methyl-, 4- or 5-ethyl-, 4- or 5-n-propyl-, 4- or 5-isopropyl-, 4- or 5-n-butyl-, 4- or 5-isobutyl-, 4- or 5-sec.- butyl-, 4- or 5-tert.-butyl, and the like, benzimidazol-2-yl) carbamic acid methyl, -ethyl, -n-propyl, -isopropyl, -n-butyl, -isobutyl, -sec.-butyl, -tert.-butyl ester, and the like; and
N-(4- or 5-methyl-, 4- or 5-ethyl-, 4- or 5-propyl-,4- or 5-isopropyl-, 4- or 5-n-butyl-, 4- or 5-isobutyl-, 4-or 5-sec.-butyl-, 4- or 5-tert.-butyl, and the like, benzimidazol-2-yl)- -amide, or -carbamoyl-methane, -ethane, -propane, -isopropane, -n-butane, -isobutane, -sec.-butane, and -tert.-butane; and the like.

A list of examples of the isocyanate, carbamic acid chloride and amine starting materials of formulas (III), (IV) and (VI) above, respectively, which may be reacted includes:
ω-cyano-methyl-, ω-cyano-ethyl-, ω-cyano-propyl-, ω-cyano-butyl-, ω-cyano-pentyl-, ω-cyano-hexyl, ω-cyano-heptyl-, ω-cyano-octyl-, ω-cyano-nonyl-, ω-cyano-decyl- and ω-cyano-undecyl, -iso-cyanate, -carbamic acid chloride, and -amine, and the like.

The various starting materials are for the most part known [compare J. Am. Chem. Soc. 56, 144–6, 1934, U.S. Patent Nos. 2,933,502, 2,933,504; and 3,010,968; Belgian Pat. No. 691 611; Ann. 562, 75–136, (1949); and Ber. 89, 2,677–81, (1956)] Those starting materials which are still new can be obtained correspondingly according to the appropriate known processes.

Reaction variant (a) is expediently carried out in an inert organic solvent, such as dimethyl sulfoxide, dimethyl formamide, dimethyl acetamide, acetone, diethyl ketone, methylene chloride, chloroform, 1,2-dichloro-ethane, chloro-benzene, toluene, acetonitrile, benzonitrile, ethyl acetate, and the like. Such reaction variant (a) is generally carried out at a temperature with the range of substantially between about −10° to +60° C, and preferably between about 20°–40° C. For variant (a), in this regard, tertiary amines, such as triethyl amine, dimethyl aniline, pyridine, picoline, and the like, may be present as reaction accelerators. It is also possible to carry out the reaction in a tertiary amine as diluent or solvent or, when 2-amino-benzimidazole starting materials of formula (II) above are used, in which R represents alkoxycarbonyl or alkylcarbonyl, to carry out the reaction in excess cyanoalkyl-isocyanate of formula (III) above as diluent or solvent.

In carrying out reaction variant (b), the ω-cyano-alkyl-carbamic acid chloride of formula (IV) above may be added to a mixture consisting of the 2-amino-benzimidazole starting material of formula (II) above, and an inert organic solvent of the type specified above in connection with reaction variant (a) or, for example, a tertiary amine, such as triethyl amine, dimethyl-benzyl amine, diethyl aniline, pyridine, picoline, quinoline, and the like, or an alkaline-reacting substance, such as potassium carbonate, sodium carbonate, borax, trilithium phosphate, and the like. It is also possible in connection with reaction variant (b) to add the ω-cyanoalkyl-carbamic acid chloride of formula (IV) above to a mixture consisting of the 2-amino-benzimidazole starting material of formula (II) above and an inert, water-immiscible organic solvent and water as well as an acid acceptor, i.e., acid binding agent, of the usual type such as a tertiary amine or solution of alkali or solution of alkali metal carbonate. The reaction temperatures for variant (b) are preferably from substantially between about −10° to +10° C.

In carrying out reaction variant (c), the substituted 2-amino-benzimidazole starting material of formula (II) above, preferably in the form of the monohydrochloride, may be treated with phosgene at substantially between about −40° to +20° C, and preferably at between about −20° to 0° C, in an inert organic solvent, such as acetonitrile, benzonitrile, acetone, methylethyl ketone, benzene, chlorobenzene, methylene chloride, ethylene chloride, and the like, and an equimolar amount of a tertiary amine, such as dimethyl aniline, diethyl aniline, pyridine, picoline, quinoline, and the like, may then be added as acid binding agent. After the excess phosgene has been distilled off (this is advantageously done in a vacuum) or after treatment of the reaction mixture with water, reaction of the intermediately formed chloroformyl-benzimidazole of formula (V) above with the ω-cyano-alkylamine of formula (VI) above may be effected, according to variant (c), in the presence of the stoichiometric amount of a tertiary amine, or the like, as acid binding agent. It is also possible first to add to the two-phase reaction mixture consisting of water and an inert, water immiscible solvent the ω-cyano-alkyl-amine to be reacted according to variant (c) and then the necessary amount of a tertiary amine, aqueous solution of alkali or solution of alkali metal carbonate, or the like, or to use excess ω-cyano-alkyl amine, for the binding of the hydrogen chloride which forms. The reaction temperatures for variant (c) are generally substantially between about −30° to +40° C, and preferably between about −3° to +10° C.

The particular new compounds according to the present invention may be present in a tautomeric equilibrium corresponding to both formula (I′) and formula (I″) above, as the artisan will appreciate. For reasons of simplicity, the corresponding specific formulas according to the tautomeric limiting state of formula (I″) above are not shown in each appropriate instance herein, yet it will be realized that for the purposes of the present invention, the stated specific formulas corresponding to the tautomeric limiting state of formula (I′) above are deemed herein in each individual case to comprise the corresponding formulas according to the tautomeric limiting state of formula (I″) herein just as if such corresponding formula (I″) were set forth specifically in each appropriate instance.

Advantageously, the active compounds according to the present invention exhibit strong fungitoxic and antibacterial activity and are distinguished by a broad spectrum of activity. In the concentrations necessary for the control of fungi and bacteria, the instant active compounds do not damage cultivated plants, and also have a low toxicity to warm-blooded animals. For these reasons, such active compounds are suitable for use as crop protection agents for the control of fungi and bacteria.

Fungitoxic agents in crop protection, such as the instant compounds, are used, for example, for the control of fungi from the most diverse classes including *Archimycetes*, *Phycomycetes*, *Ascomycetes*, *Basidiomycetes* and *Fungi Imperfecti*.

The active compounds according to the present invention have a very broad spectrum of activity, as aforesaid, and can be applied against parasitic fungi and bacteria which infest above-the-soil parts of plants or attack the plants from the soil, as well as seed-borne pathogenic agents.

In particular, the active compounds according to the present invention act specifically against numerous plant-pathogenic fungi which infest cultivated plants, such as *Cochliobolus miyabeanus*, *Mycosphaerella musicola*, *Cercospora personata*, *Botrytis cinerea* and *Alternaria* species, *Venturia* species (causative organisms of apple scab and pear scab), *Phytophthora infestans*, *Plamopara viticola*, and the like. In addition, such compounds show a very distinct activity against powdery mildew fungi, such as *Podosphaera leucotricha* (powdery mildew of apples) and *Erysiphe polyphaga* (powdery mildew of cucumbers). Surprisingly, the instant active compounds have not only a protective action but also a curative and systemic effect.

Significantly, the active compounds according to the present invention show an excellent activity against the fungi *Piricularia oryzae* and *Pellicularia sasakii*, by reason of which they can be used for the joint control of these two rice diseases. This joint control represents a substantial advance, since, up to now, agents of different chemical constitution were individually necessary to combat these two fungi.

The instant active compounds are likewise highly effective and of special practical importance when they are used as seed dressings or soil treatment agents against phytopathogenic fungi which adhere to the seed or occur in the soil and cause, in cultivated plants, diseases of seedlings, root-rots, tracheomycoses, stem, blade, leaf, blossom, fruit or seed diseases, such as *Tilletia caries*, *Helminthosporium gramineum*, *Fusarium nivale*, *Fusarium culmorum*, *Rhizoctonia solani*, *Phialophora cinerescens*, *Verticillium alboatrum*, *Fusarium dianthi*, *Fusarium cubense*, *Fusarium oxysporum*, *Fusarium solani*, *Sclerotinia schlerotiorum*, *Thielaviopsis basicola*, *Phytophthora cactorum*, and the like.

As examples of bacteria which can be controlled in accordance with the present invention, there may be mentioned: *Xanthomonas oryzae*, *Pseudomonas lachrymans*, and the like.

Significantly, the instant active compounds also show an insecticidal, acaricidal and ovicidal activity and can therefore be used for the control of noxious sucking and biting insects, *Diptera* and mites (*Acarina*), such as *Myzus persicae*, *Plutella maculipennis*, *Drosophila melanogaster*, *Tetranychus urticae*, and the like. The active compounds are particularly effective against the corresponding egg stages.

The active compounds according to the instant invention can be utilized, if desired in the form of the usual formulations or compositions with conventional inert (i.e., plant compatible or herbicidally inert) pesticide diluents or extenders, i.e., diluents or extenders of the type usable in conventional pesticide formulations or compositions, e.g., conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g., benzene, toluene, xylene, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, alumina, silica, chalk, i.e., calcium carbonate, talc, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or herbicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent, and preferably 0.5–90 percent, by weight of the mixture, whereas carrier composition mixtures suitable for direct application or field application generally con-template those in which the active compound is present in an amount substantially between about 0.0001–10 percent, preferably 0.01–1 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

In the case of seed treatment, generally, the active compound is used in an amount of substantially between about 0.1–10 g, and preferably between about 0.5–5 g, per kg of seed.

For soil treatment, generally, the active compound is used in an amount of substantially between about 1–500 g, and preferably between about 10–200 g, per cubic meter of soil.

The active compound can also be used in accordance with the well-known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 percent to about 95 percent by weight of the active compound or even the 100 percent active substance alone, e.g., about 20–100 percent by weight of the active compound.

Furthermore, the present invention contemplates methods of selectively killing, combating or controlling pests, and more particularly fungi, bacteria, arthropods, e.g., insects and acarids, as well as the corresponding arthropod egg stages, and the like, especially fungi and bacteria, which comprise applying to such pests, i.e., at least one of correspondingly (a) such fungi, (b) such bacteria, (c) such arthropods, (d) such arthropod egg stages, and (e) the corresponding habitat thereof, i.e., the locus to be protected, a pesticidally, i.e., a correspondingly fungicidally, bactericidally, arthropodicidally, e.g. insecticidally and acaricidally, or ovicidally, effective or toxic amount of the particular active compound of the invention alone or together with a carrier vehicle as noted above. The instant formulations or compositions are applied in the usual manner, for instance by spraying, atomizing, vaporizing, fumigating, scattering, dusting, watering, squirting, sprinkling, pouring, dressing, e.g., dry dressing, via incrustation, and the like.

It will be realized, of course, that in connection with the fungicidal, bactericidal, insecticidal, acaricidal and ovicidal use of the instant compounds, the concentration of the particular active compound utilized, above or in admixture with the carrier vehicle, will depend upon the intended application, as the artisan will appreciate, and may be varied within a fairly wide range depending upon the weather conditions and the purpose for which the compound is used. Therefore, in special cases, it is possible to go above or below the aforementioned concentration ranges and amounts per unit weight and volume.

The fungicidal effectiveness as well as the antibacterial effectiveness of the particular compounds of the present invention are illustrated, without limitation, by the following examples:

EXAMPLE 1

Piricularia and Pellicularia tests
Solvent: 4 parts by weight acetone
Dispersing agent: 0.05 part by weight sodium oleate
Water: 95.75 parts by weight
Other additive: 0.2 part by weight gelatin i. Protective Fungicidal Action The amount of the particular active compound required for the desired final concentration of such active compound in the spray liquor is mixed with the stated amount of solvent, and the resulting concentrate is then diluted with the stated amount of water containing the stated dispersing agent and other additive.

Two batches, each consisting of 30 rice plants about 2–4 weeks old, are sprayed with the given spray liquor until dripping wet. The plants remain in a greenhouse at temperatures of 22° to 24° C and a relative atmospheric humidity of about 70 percent until they are dry. One batch of the plants is then inoculated with an aqueous suspension of 100,000 to 200,000 spores/ml of *Piricularia oryzae* and placed in a chamber kept at 24° to 26° C and 100 percent relative atmospheric humidity. The other batch of the plants is infected with a culture of *Pellicularia sasakii* grown on malt agar and placed in a chamber kept at 28° to 30° C and 100 percent relative atmospheric humidity.

Five to 8 days after inoculation, the infestation of all the leaves present at the time of inoculation with *Piricularia oryzae* is determined as a percentage of the untreated but also inoculated control plants. In the case of the plants infected with *Pellicularia sasakii*, the infestation on the leaf sheaths after the same time is also determined in proportion to the untreated but infected control plants. 0 percent means no infestation; whereas 100 percent means that the infestation is exactly as great as in the case of the control plants.

ii. Additional test/curative fungicidal action

In order to ascertain the curative fungicidal action, the above test (i) is repeated, except that the given active compound is applied not before, but only 16 hours after, inoculation.

The particular active compounds tested, their concentrations, and the results obtained for tests (i) and (ii) can be seen from the following Table 1.

TABLE 1

Piricularia (a) and Pellicularia (b) test

| Active compound No. (see Ex. 12-18) | | Infestation as a percentage of the infestation of the untreated control with a concentration of active compound (in percent) of— | | | |
|---|---|---|---|---|---|
| | | (a) | | (b) | |
| | | 0.05 | 0.025 | 0.05 | 0.025 |
| (A) 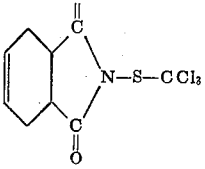 (known) | Protective | 25 | | 100 | |
| | Curative | 100 | | | |
| (3₁) | Protective | 0 | 0 | 0 | 17 |
| | Curative | 0 | 0 | | |
| (5₁) | Protective | 0 | 0 | 0 | 29 |
| | Curative | 0 | 50 | | |
| (1₄) | Protective | 0 | 0 | 0 | 0 |
| | Curative | 0 | 0 | | |
| (2₁) | Protective | 0 | 0 | 0 | 0 |
| (4₁) | Protective | 0 | | 0 | |

EXAMPLE 2

Mycelium growth test

Nutrient medium used:
20 parts by weight agar-agar
30 parts by weight malt extract
950 parts by weight distilled water Proportion of solvent to nutrient medium:
2 parts by weight acetone
100 parts by weight agar nutrient medium The amount of the particular active compound required for the desired final concentration of such active compound in the nutrient medium is mixed with the stated amount of solvent. The resulting concentrate is then thoroughly mixed, in the stated proportion, with the liquid nutrient medium (which has been cooled to 42° C) and is thereafter poured into Petri dishes of 9 cm diameter. Control dishes to which the active compound preparation has not been added are also set up.

When the nutrient medium has cooled and solidified, the dishes are inoculated with the species of fungi stated in the Table below and incubated at about 21° C.

Evaluation is carried out after 4–10 days, dependent upon the rate of growth of the fungi. When evaluation is carried out the radial growth of the mycelium on the treated nutrient media is compared with the growth on the control nutrient media. In the evaluation of the fungus growth, the following characteristic values are used:

0 no fungus growth
1 very strong inhibition of growth
2 medium inhibition of growth
3 slight inhibition of growth
4 growth equal to that of untreated control.

The particular active compounds tested, their concentrations, and the results obtained can be seen from the following Table 2.

EXAMPLE 3

Bacteria test/Xanthomonas oryzae
Solvent: 4 parts by weight acetone
Dispersing agent: 0.05 part by weight sodium oleate
Water: 95.75 parts by weight
Other additive: 0.2 part by weight gelatin The amount of the particular active compound required for the desired final concentration of such active compound in the spray liquor is mixed with the stated amount of solvent, and the resulting concentrate is then diluted with the stated amount of water containing the stated dispersing agent and other additive.

Thirty rice plants about 30 days old are sprayed with the given spray liquor until dripping wet. The plants remain in a greenhouse at temperature of 22° to 24° C and a relative atmospheric humidity of about 70 percent until they are dry. Needles are then dipped into an aqueous bacteria suspension of *Xanthomonas oryzae* and the plants are inoculated by pricking the leaves. After inoculation, the plants are placed in a chamber kept at 26° to 28° C and 80 percent relative atmospheric humidity.

Ten days after inoculation, the infestation in the case of all the inoculated leaves injured by pricks and previously treated with the given active compound preparation is determined as a percentage of the untreated but also inoculated leaves of the control plants. 0 percent means that there is no infestation; whereas 100 percent means that the infestation is exactly as great as in the case of the control plants.

The particular active compounds tested, their concentrations, and the results obtained can be seen from the following Table 3.

TABLE 2

Mycelium growth test

| Active compound No. (see Ex. 12-18) | Concentration of active compound in p.p.m. | Fungi | | | | | | | | | |
|---|---|---|---|---|---|---|---|---|---|---|---|
| | | Piricularia oryzae | Phialophora cinerescens | Pellicularia | Cercospora muscae | Verticillium alboatrum | Fusarium dianthi | Fusarium oxysphorum | Fusarium culmorum | Sclerotinia sclerotiorum | Thielariopsis basicola |
| Untreated control | | 4 | 4 | 4 | 4 | 4 | 4 | 4 | 4 | 4 | 4 |
| (3₂) | 10 | 0 | 0 | 0 | 0 | 0 | 0 | 0 | 0 | 0 | 0 |
| (5₂) | 10 | 0 | 0 | 2 | 0 | 0 | 0 | | | | |
| (1₅) | 10 | 0 | 0 | 0 | 0 | 0 | 0 | 0 | 0 | 0 | 0 |
| (2₂) | 10 | | | | | | | | 0 | 0 | 0 |
| (4₂) | 10 | 0 | 1 | 1 | 0 | 0 | 0 | | | 0 | 0 |

TABLE 3

Bacteria test/Xanthomonas oryzae

| Active compound no. (see Ex. 12–18) | Infestation as a percentage of the infestation of the untreated control with a concentration of active compound (in %) of 0.05 |
|---|---|
| (3₃) | 25 |
| (5₃) | 8 |
| (1₆) | 50 |

EXAMPLE 4

Seed dressing test/bunt of wheat (seed-borne mycosis)

To produce a suitable dry dressing, the particular active compound is extended with a mixture of equal parts by weight of talc and kieselguhr to provide a finely powdered mixture with the desired final concentration of such active compound.

Wheat seed is contaminated with 5 g of the chlamydospores of *Tilletia caries* per kg of seed. To apply the given dressing, the seed is shaken with such dressing in a closed glass flask. The seed, on moist loam under a cover of a layer of muslin and 2 cm of moderately moist compost soil, is exposed to optimum germination conditions for the spores for 10 days at 10° C in a refrigerator.

The germination of the spores on the wheat grains, each of which is contaminated with about 100,000 spores, is subsequently determined microscopically. The smaller the number of spores which have germinated, the more effective is the given active compound.

The particular active compounds tested, their concentrations in the dressing, the amounts of dressing used and the percentage spore germination obtained can be seen from the following Table 4.

TABLE 4

Seed dressing test/bunt of wheat

| Active compound no. (see Ex. 12–18) | Concentration of active compound in % by weight | Amount of dressing applied in g/kg seed | Spore germination in % |
|---|---|---|---|
| undressed | — | — | >10 |
| (3₄) | 30 | 1 | 0.000 |
|  | 10 | 1 | 0.005 |
| (5₄) | 30 | 1 | 0.000 |
|  | 10 | 1 | 0.005 |
| (1₇) | 30 | 1 | 0.000 |
|  | 10 | 1 | 0.005 |
| (2₃) | 30 | 1 | 0.000 |

EXAMPLE 5

Phytophthora test

Solvent: 4.7 parts by weight acetone
Dispersing agent: 0.3 part by weight alkylaryl polyglycol ether
Water: 95.0 parts by weight The amount of the particular active compound required for the desired final concentration of such active compound in the spray liquid is mixed with the stated amount of solvent and the resulting concentrate is then diluted with the stated amount of water containing the stated dispersing agent.

Young tomato plants (Bonny best) with two to six foliage leaves are sprayed with the given spray liquid until dripping wet. The plants remain in a greenhouse for 24 hours at 20° C and at a relative atmospheric humidity of 70 percent. The tomato plants are then inoculated with an aqueous spore suspension of *Phytophthora infestans*. The plants are then brought into a moist chamber kept at an atmospheric humidity of 100 percent and a temperature of 18°–20° C.

After 5 days the infestation of the tomato plants is determined as a percentage of the untreated but also inoculated control plants. Zero percent means no infestation; whereas 100 percent means that the infestation is exactly as great as in the case of the control plants.

The particular active compounds tested, their concentrations, and the results obtained can be seen from the following Table 5.

TABLE 5.—PHYTOPHTHORA TEST

| Active compound number (see Ex. 12–18) | Infestation as a percentage of the infestation of the untreated control with a concentration of active compound (in percent) of— | |
|---|---|---|
| | 0.025 | 0.0062 |
| (A) $\begin{array}{c}\text{O}\\ \diagdown\\ \text{N—S—CCl}_3\\ \diagup\\ \text{O}\end{array}$ (known) | 52 | 75 |
| (3₅) | 12 | 49 |
| (1₈) | 1 | 12 |
| (4₃) | 36 | 65 |
| (5₅) | 2 | 17 |
| (6₁) | 15 | |
| (7₁) | 7 | 25 |

EXAMPLE 6

Erysiphe test

Solvent: 4.7 parts by weight acetone
Emulsifier: 0.3 part by weight alkylaryl polyglycol ether
Water: 95.0 parts by weight The amount of the particular active compound required for the desired final concentration in the spray liquid is mixed with the stated amount of solvent, and the resulting concentrate is then diluted with the stated amount of water containing the stated emulsifier.

Young cucumber plants (Delikatess variety) with about three foliage leaves are sprayed with the given spray liquid until dripping wet. The cucumber plants remain in a greenhouse for 24 hours to dry. Such plants are then, for the purpose of inoculation, dusted with conidia of the fungus *Erysiphe polyphaga*. The plants are subsequently placed in a greenhouse kept at 23°–24° C and at a relative atmospheric humidity of about 75 percent.

After 12 days, the infestation of the cucumber plants is determined as a percentage of the untreated but also inoculated control plants. Zero percent means no infestation; whereas 100 percent that the infestation is exactly as great as in the case of the control plants.

The particular active compounds tested, their concentrations, and the results obtained can be seen from the following Table 6.

TABLE 6.—ERYSIPHE TEST

| Active compound number (see Ex. 12–18) | Infestation as a percentage of the infestation of the untreated control with a concentration of active compound (in percent) of— | |
|---|---|---|
| | 0.0031 | 0.00156 |
| (A) $\begin{array}{c}\text{O}\\ \diagdown\\ \text{N—S—CCl}_3\\ \diagup\\ \text{O}\end{array}$ (known) | 100 | 100 |
| (2₄) | 20 | 30 |
| (3₆) | 10 | 27 |
| (1₉) | 13 | 23 |
| (5₆) | 40 | 53 |

EXAMPLE 7

Fusicladium test (apple scab) [Protective]
Solvent: 4.7 parts by weight acetone

Emulsifier: 0.3 part by weight alkylaryl polyglycol ether
Water: 95.0 parts by weight The amount of the particular active compound required for the desired final concentration of such active compound in the spray liquid is mixed with the stated amount of solvent, and the resulting concentrate is then diluted with the stated amount of water containing the stated emulsifier.

Young apple seedlings in the four to six leaf stage are sprayed with the given spray liquid until dripping wet. The plants remain in a greenhouse for 24 hours at 20° C and at a relative atmospheric humidity of 70 percent. Such plants are then inoculated with an aqueous conidium suspension of the apple scab causative organism (*Fusicladium dendriticum* Fuck.) and incubated for 18 hours in a humidity chamber kept at 18°–20° C and at a relative atmospheric humidity of 100 percent.

The plants are then again placed in a greenhouse for 14 days.

Fifteen days after inoculation, the infestation of the seedlings is determined as a percentage of the untreated but also inoculated control plants. Zero percent means no infestation; whereas 100 percent means that the infestation is exactly as great as in the case of the control plants.

The particular active compounds tested, their concentrations, and the results obtained can be seen from the following Table 7.

TABLE 7.—FUSICLADIUM TEST (PROTECTIVE)

| Active compound number (see Ex. 12–18) | Infestation as a percentage of the infestation of the untreated control with a concentration of active compound (in percent) of— | |
|---|---|---|
| | 0.00156 | 0.00039 |
| (A) (known) | 32 | 77 |
| (3₇) | 2 | 20 |
| (1₁₀) | 0 | 28 |
| (4₄) | 15 | 59 |
| (5₇) | 7 | 45 |

EXAMPLE 8

Podosphaera test (powdery mildew of apples) [Protective]
Solvent: 4.7 parts by weight acetone
Emulsifier: 0.3 part by weight alkylaryl polyglycol ether
Water: 95.0 parts by weight The amount of the particular active compound required for the desired final concentration of such active compound in the spray liquid is mixed with the stated amount of solvent, and the resulting concentrate is then diluted with the stated amount of water containing the stated emulsifier.

Young apple seedlings in the four to six leaf stage are sprayed with the given spray liquid until dripping wet. The plants remain in a greenhouse for 24 hours at 20° C and at a relative atmospheric humidity of 70 percent. Such plants are then inoculated by dusting with conidia of the apple powder mildew causative organism (*Podosphaera leucotricha* Salm.) and placed in a greenhouse kept at a temperature of 21°–23° C and at a relative atmospheric humidity of about 70 percent.

Ten days after inoculation, the infestation of the seedlings is determined as a percentage of the untreated but also inoculated control plants. Zero percent means no infestation; whereas 100 percent means that the infestation is exactly as great as in the case of the control plants.

The particular active compounds tested, their concentrations, and the results obtained can be seen from the following Table 8.

TABLE 8.—PODOSPHAERA TEST (PROTECTIVE)

| Active compound number (see Ex. 12–18) | Infestation as a percentage of the infestation of the untreated control with a concentration of active compound (in percent) of— | |
|---|---|---|
| | 0.00039 | 0.00019 |
| (A) (known) | 100 | 100 |
| (3₈) | 0 | 1 |
| (1₁₁) | 1 | 0 |

EXAMPLE 9

Fusicladium test (apple scab) [Curative]
Solvent: 4.7 parts by weight acetone
Emulsifier: 0.3 part by weight alkylaryl polyglycol ether
Water: 95.0 parts by weight The amount of the particular active compound required for the desired final concentration of such active compound in the spray liquid is mixed with the stated amount of solvent, and the resulting concentrate is then diluted with the stated amount of water containing the stated emulsifier.

Young apple seedlings in the 4–6 leaf stage are inoculated with an aqueous conidium suspension of the apple scab causative organism *Fusicladium dendriticum* Fuck. and incubated for 18 hours in a humidity chamber kept at 18°–20° C and at an atmospheric humidity of 100 percent. The plants are then placed in a greenhouse where they dry.

After standing for a suitable period of time, the plants are then sprayed until dripping wet with the given spray liquid prepared in the manner described above. The plants are then again placed in a greenhouse.

Fifteen days after inoculation, the infestation of the apple seedlings is determined as a percentage of the untreated but also inoculated control plants. Zero percent means no infestation; whereas 100 percent means that the infestation is exactly as great as in the case of the control plants.

The particular active compounds tested, their concentrations, the period of time between inoculation and spraying and the results obtained can be seen from the following table, Table 9.

TABLE 9.—FUSICLADIUM TEST (CURATIVE)

| Active compound number (see Ex. 12–18) | Infestation as a percentage of the infestation of the untreated control with a concentration of active compound (in percent) of— | |
|---|---|---|
| | 0.0125 | 0.0062 |
| (A) | 100 | 100 |
| (2₅) | 1 | 9 |
| (3₉) | 9 | 16 |
| (5₈) | 24 | 22 |

NOTE.—Residence period in hours 42.

EXAMPLE 10

Erysiphe test (systemic)
Solvent: 4.7 parts by weight acetone
Emulsifier: 0.3 part by weight alkylaryl polyglycol ether
Water: 95.0 parts by weight The amount of the particular active compound required for the desired final concentration in the treatment liquid is mixed with the stated amount of the solvent, and the resulting concentrate is then diluted with the stated amount of water containing the stated emulsifier.

Young cucumber plants, in the one to two-leaf stage, grown in standard soil are watered within a week with 20 cc of the treatment liquid in the stated active compound concentration with reference to 100 cc of soil, i.e. by pouring the treatment liquid onto the plants and viscinal soil. The plants thus treated are, after treatment, inoculated with conidia of the fungus *Erysiphe cichoraceum*. The plants are then placed in a greenhouse kept at 23°–24° C and at a relative atmospheric humidity of 70 percent.

After 12 days, the infestation of the cucumber plants is determined as a percentage of the untreated but also inoculated control plants. Zero percent means no infestation; whereas 100 percent means that the infestation is exactly as great as in the case of the control plants.

The particular active compounds tested, their concentrations, and the results obtained can be seen from the following Table 10.

TABLE 10

Erysiphe test (systemic)

| Active compound no. (see Ex. 12–18) | Infestation as a percentage of the infestation of the untreated control with a concentration of active compound of | |
|---|---|---|
| | 30 ppm | 15 ppm |
| $(3_{10})$ | 0 | 48 |
| $(1_{12})$ | 0 | 52 |
| $(5_9)$ | 68 | 100 |

EXAMPLE 11

Fusicladium test (systemic)
Solvent: 4.7 parts by weight acetone
Dispersing agent: 0.3 part by weight alkylaryl polyglycol ether
Water: 95.0 parts by weight The amount of the particular active compound required for the desired final concentration of such active compound in the treatment liquid is mixed with the stated amount of solvent, and the resulting concentrate is then diluted with the stated amount of water containing the stated dispersing agent.

Young apple seedlings, in the 3–4 leaf stage, grown in standard soil are watered once within a week with 20 cc of the treatment liquid in the stated active compound concentration with reference to 100 cc of soil, i.e. by pouring the treatment liquid onto the plants and viscinal soil. The plants thus treated are, after treatment, inoculated with an aqueous conidium suspension of *Fusicladium dentricum* Fuck. and incubated for 18 hours in a humidity chamber kept at 18°–20° C and at a relative atmospheric humidity of 100 percent. The plants are then again place in a greenhouse for 14 days.

Fifteen days after inoculation, the infestation of the seedlings is determined as a percentage of the untreated but also inoculated control plants. Zero percent means no infestation; whereas 100 percent means that the infestation is exactly as great as in the case of the control plants.

The particular active compounds tested, their concentrations and the results obtained can be seen from the following Table 11.

TABLE 11

Fusicladium test (systemic)

| Active compound no. (see Ex. 12–18) | Infestation as a percentage of the infestation of the untreated control with a concentration of active compound of 30 ppm |
|---|---|
| $(3_{11})$ | 4 |
| $(1_{13})$ | 74 |
| $(5_{10})$ | 60 |

The following further examples are set forth to illustrate, without limitation, the manner of producing the instant active compounds according to the present invention.

EXAMPLE 12 [reaction variant (a)]

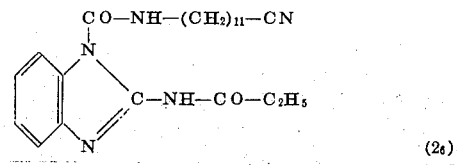

(2₆)

i. 10 g (0.045 mol) ω-isocyanato-dodecanoic acid nitrile and 10 ml acetone are added to 7.7 g (0.0376 mol) N-(benzimidazol-2-yl)-carbamic acid ethyl ester, 30 ml of dry acetone and 0.1 ml picoline, and stirred at 40° C for 2 hours. After standing for 18 hours at 23° C, the reaction mixture is diluted with 40 ml acetone. The resulting crystals are separated and washed with ligroin. Such crystals, unlike N-(benzimidazol-2-yl)-carbamic acid ethyl ester, are completely soluble in methylene chloride thus indicating that all N-(benzimidazol-2-yl)-carbamic acid ethyl ester has been reacted. The crystals of the desired product are dried at 40° C/0.1 mm Hg. Yield 13.5 g of 2-ethoxy-carbonyl-amino-3-(ω-cyano-undecyl)-carbamyl-benzimidazole.

| Analysis: | N | O |
|---|---|---|
| Calculated: | 16.37% | 11.23% |
| Found: | 16.2% | 11.5 % |

The infra-red spectrum of the compound in KBr shows an N—H group, the proton of which stands in a hydrogen bridge bond, through a broad absorption band at 3,200 cm$^{-1}$, the —(CH$_2$)$_x$ group at 2,920 cm$^{-1}$ and at 715 cm$^{-1}$, the C = O group of the cyanoundecyl-carbamyl substituent at 1,710 cm$^{-1}$, and the nitrile group at 2,240 cm$^{-1}$. In the spectrum, no —N = C = O band is indicated.

Preparation of the N-(benzimidazol-2-yl)-carbamic acid ethyl ester used as starting material ii. 302 g (2.78 mols) chloroformic acid ethyl ester are added to 2 mols of S-benzyl-isothiourea hydrochloride in 800 ml of water and 200 ml acetonitrile. 25 percent solution of sodium hydroxide is added dropwise so rapidly that, with external cooling, a temperature of +25° C is not exceeded, and the solution of sodium hydroxide is added for as long as the pH value does not rise above 8. Stirring is effected for a further 80 minutes during which control of the pH value is continued. If necessary, a little more solution of sodium hydroxide is added. 1.5 liters of water are added to the two-phase mixture and the aqueous phase is separated. 0.5 liter of water, 216 g (2 mols) o-phenylene-diamine as well as 180 g acetic acid are added to the heavy organic phase which contains N$^1$-ethoxy-carbonyl-2-(S-benzyl)-iso-thiourea and N$^1$, N$^2$-bis-(ethoxy-carbonyl)-2-(S-benzyl)-isothiourea, and the mixture is heated, with stirring, to 80°–90° C in 15 minutes. It is kept at this temperature for 2 hours. After cooling, the aqueous phase is separated, and the paste-like reaction product is stirred with water and then with isopropyl alcohol, after which the crystals formed are filtered off with suction. The crystals are washed with isopropyl alcohol and with water and dried in a vacuum. 335 g N-(benzimidazol-2-yl)-carbamic acid ethyl ester are obtained, which is 82 percent of the theory. By distillation of the isopropyl alcohol-containing wash liquor, 156 g benzylmercaptan (b.p. 86° C/16 mm Hg) are obtained.

Preparation of the ω-isocyanato-dodecanoic acid nitrile used as starting material iii. A solution of 40 g ω-amino-dodecanoic acid nitrile in 100 ml chlorobenzene is saturated with hydrogen chloride and then treated with 45 g phosgene for 2 hours at 120° C. After brief blowing out of the reaction mixture with nitrogen, distillation is effected. Yield 42.5 g of ω-isocyanato-dodecanoic acid nitrile (b.p. 124°–126.5° C/0.1 mm Hg).

EXAMPLE 13 [reaction variant (a)]

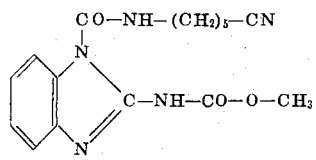

(3₁₂)

i. 38 g (0.199 mol) N-(benzimidazol-2-yl)-carbamic acid methyl ester, 80 ml methylene chloride, 1 ml picoline, and 30 g (0.218 mol) ω-isocyanato-caproic acid nitrile, are kept at 40° C for 3.5 hours. The reaction product is dissolved out by addition of 300 ml methylene chloride. Filtration from the undissolved N-(benzimidazol-2-yl)-carbamic acid methyl ester starting material is effected. 200 ml benzine are added to the filtrate and the methylene chloride is evaporated in a water-jet vacuum; crystals separate. These crystals are filtered off with suction and washed with a little water and dried at 40° C/0.1 mm Hg. Yield 58.5 g of 2-methoxy-carbonylamino-3-(ω-cyano-pentyl)-carbamyl-benzimidazole.

Analysis:

|  | N | O |
|---|---|---|
| Calculated: | 21.26% | 14.57% |
| Found: | 21.2 % | 14.5 % |

The infra-red spectrum of the compound in KBr shows an N—H—group at 3,290 cm⁻¹, the —(CH₂)ₓ group at 2,940 cm⁻¹ and 710 cm⁻¹, the nitrile group at 2,240 cm⁻¹ and the C O group of the ω-cyano-pentyl-carbamyl substituent at 1,715 cm⁻¹. An O = C = N group is not evidenced by the spectrum. Preparation of N-(benzimidazol-2-yl)-carbamic acid methyl ester used as starting material ii. 1.050 g (3.66 mols) 2, 4-diisopropyl-benzyl-isothiourea hydrochloride (compare e.g. French Pat. No. 1,524,675), 2.2 liters acetonitrile, 1.1 liters of water and 734 g (7.77 mols) chloroformic acid methyl ester, are provided. 25 percent solution of sodium hydroxide is, with external cooling, run in so rapidly that the temperature does not exceed +25° C and in such amount that the pH value of 8 is not exceeded. Stirring is effected for 30 minutes, with continued control of the pH value. N¹, N²-bis-(methoxy-carbonyl)-S-(2',4'-diisopropyl-benzyl)-isothiourea crystallizes out during the reaction. With the aid of an immersion filter, the liquid phase is suction filtered as far as possible, and washing is effected with about 5 liters of water. 395 g (3.66 mols) o-phenylene-diamine, 330 g acetic acid and 2.8 liters of water, are then added to the reaction vessel, and heating to 80°–90° C is effected for 100 minutes. After cooling, the liquid phase is drawn off, and the pasty reaction product is washed once with water and then with isopropyl alcohol, whereupon crystals are precipitated. The crystals are separated, washed with isopropyl alcohol and with water, and then dried in a vacuum. Yield 582 g of N-(benzimidazol-2-yl)-carbamic acid methyl ester. From the isopropyl-alcohol-containing wash liquor, 480 g 2,4-diisopropyl-benzylmercaptan of boiling point 70°–73° C/0.08 mm Hg can be obtained by distillation. Instead of 2, 4-diisopropyl-benzyl-isothiourea hydrochloride, 2, 5-diisopropyl-benzyl-isothiourea hydrochloride can also be used, 2,5-diisopropyl-benzylmercaptan of boiling point 88° C/0.11 mm Hg being obtained as by-product.

EXAMPLE 14 [reaction variant (a)]

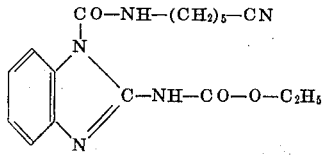

(1₁₁)

25 g ω-isocyanato-caproic acid nitrile are added to 31.8 g N-(benzimidazol-2-yl)-carbamic acid ethyl ester, 17 g picoline, and 250 ml dimethyl formamide, and kept at 60° C for 3 hours. The solution is filtered and, after standing for 16 hours at room temperature, diluted with 2 liters of water. The crystals formed are separated, washed with water and with 50 percent aqueous acetonitrile, and dried at 60° C/0.1 mm Hg. Yield 46.5 g of 2-ethoxy-carbonylamino-3-(ω-cyano-pentyl)-carbamyl-benzimidazole.

Analysis:

|  | N | O |
|---|---|---|
| Calculated: | 20.4% | 13.98% |
| Found: | 20.5% | 14.2 % |

The infra-red spectrum of the compound in KBr shows a strongly associated N—H group at 3,200 cm⁻¹, the —(CH₂)ₓ group at 2,930 cm⁻¹ and at 720 cm⁻¹, the nitrile group at 2,240 cm⁻¹ and the C = O group of the cyano-pentyl-carbamyl substituent at 1,715 cm⁻¹.

EXAMPLE 15 [reaction variant (a)]

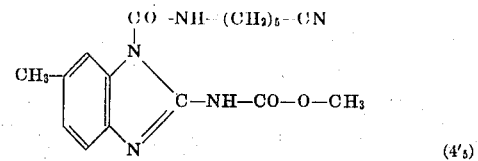

(4'₅)

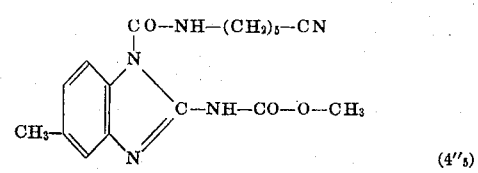

(4''₅)

The compounds of the above formulas i.e. 2-methoxy-carbonylamino-3-(ω-cyano-pentyl)-carbamyl-5-methyl-benzimidazole (4') and 2-methoxy-carbonylamino-3-(ω-cyano-pentyl)-carbamyl-6-methyl-benzimidazole (4''), are obtained as a mixture of m.p. (decomp.) 122° C, when starting from N-(5-methyl-benzimidazol-2-yl)-carbamic acid methyl ester and a method analogous to that of Examples 12 to 14 is used.

The infra-red spectrum of the mixture of the formula (4) compounds shows the —(CH₂)ₓ group at 2,930 cm⁻¹, the nitrile group at 2,240 cm⁻¹ and two C = O bands of the ω-cyano-pentyl-carbamyl substituent at 1,710 cm⁻¹ and 1,735 cm⁻¹. An O = C = N group is not evidenced by the spectrum.

EXAMPLE 16 [reaction variant (a)]

Analogous to the procedure of Examples 12–14, there is obtained

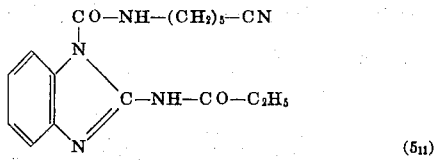

(5₁₁)

2-propionyl-amino-3-(ω-cyano-pentyl)-carbamyl-benzimidazole

Analysis:

|  | N | O |
|---|---|---|
| Calculated: | 21.38% | 9.77% |
| Found: | 21.4 % | 9.82% |

The infra-red spectrum of the compound in KBr shows a strongly associated N—H band at 3,200 cm⁻¹, the —(CH₂)ₓ group at 2,935 cm⁻¹ and at 725 cm⁻¹, the nitrile group at 2,240 cm⁻¹ and the C = O group of the ω-cyano-pentyl-carbamyl substituent at 1,710 cm⁻¹.

EXAMPLE 17 [reaction variant (a)]

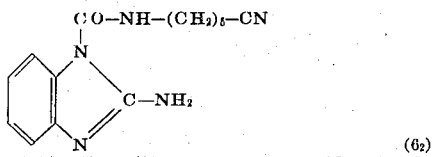

(6₂)

13.3 g (0.1 mol) 2-amino-benzimidazole are placed in 140 ml acetonitrile and 0.1 ml picoline at −10° C, and 14 g ω-isocyanato-caproic acid nitrile, are added thereto. Stirring is effected first for 1 hour at −10° C; then the temperature is slowly allowed to rise. After standing at room temperature for 18 hours, the crystals are separated, washed with a little acetonitrile and with water, and dried at 50° C/0.1 mm Hg. Yield 25.5 g of 1-(ω-cyano-pentyl)-carbamyl-2-amino-benzimidazole; m.p. 110° C (decomp.).

| Analysis: | N | O |
|---|---|---|
| Calculated: | 25.85% | 5.90% |
| Found: | 25.9 % | 6.17% |

The infra-red spectrum of the compound in KBr shows the N—H₂ group as double band at 3,418 cm⁻¹ and 3,430 cm⁻¹ as well as at 1,600 cm⁻¹, the —(CH₂)ₓ group at 2,930 cm⁻¹, the nitrile group at 2,245 cm⁻¹, and the C = O group of the ω-cyano-pentyl-carbamyl substitutent as a shoulder band at 1,705 cm⁻¹. An O = C = N group is not evidenced in the spectrum.

EXAMPLE 18

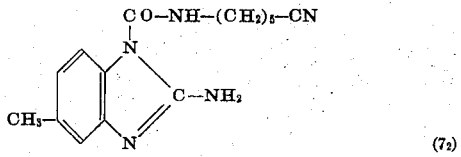

(7₂)

28 g (0.203 mol) ω-isocyanato-caproic acid nitrile are added to 29.4 g (0.2 mol) 2-amino-5-methyl-benzimidazole and 250 ml methylene chloride, at −15°C. Stirring is effected at 0° C for about 90 minutes, and then the temperature is allowed to rise and is kept at room temperature for 24 hours. The resulting crystals are separated at 0° C, washed with 150 ml methylene chloride and then with water. Yield 52 g of 2-amino-3-(ω-cyano-pentyl)-carbamyl-6-methyl-benzimidazole; m.p. 110° C (decomp.).

| Analysis: | N | O |
|---|---|---|
| Calculated: | 24.54% | 5.61% |
| Found: | 24.2 % | 5.66% |

The infra-red spectrum of the compound in KBr shows the N—H₂ group at 3,430 cm⁻¹ and at 1,608 cm⁻¹, the —(CH₂)ₓ group at 2,940 cm⁻¹ and at 705 cm⁻¹, the nitrile group at O 2,240 cm⁻¹, and the C = O group of the ω-cyano-pentyl-carbamyl substitutent as a shoulder band at 1,705 cm⁻¹. An O= C=N group is not evidenced in the spectrum.

It will be realized by the artisan that all of the foregoing compounds contemplated by the present invention possess the desired strong fungicidal, bactericidal, arthropodicidal, i.e. insecticidal and acaricidal, and ovicidal properties, with regard to a broad spectrum of activity, as well as a comparatively low toxicity toward warm-blooded creatures and a concomitantly low phytotoxicity with respect to higher plants, enabling such compounds to be used with correspondingly favorable compatibility with respect to warm-blooded creatures and higher plants for more effective control and/or elimination of fungi, bacteria, arthropods and/or arthropod egg stages, by selective application of such compounds to such fungi, bacteria, arthropods, arthropod egg stages and/or their habitat.

It will be appreciated that the instant specification and examples are set forth by way of illustration and not limitation, and that various modifications and changes may be made without departing from the spirit and scope of the present invention.

What is claimed is:

1. N-(107 -cyano-alkyl)-carbamyl - benzimidazole of the formula

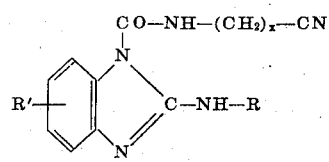

in which R is selected from the group consisting of hydrogen, alkoxycarbonyl of two to five carbon atoms and alkylcarbonyl of one to five carbon atoms, R' is selected from the group consisting of hydrogen and alkyl of one to four carbon atoms, and x is a whole number from 1 to 11.

2. Compound according to claim 1, wherein R is selected from the group consisting of hydrogen, alkoxy-carbonyl of two to four carbon atoms and alkyl-carbonyl of two to four carbon atoms, R' is selected from the group consisting of hydrogen and alkyl of one to three carbon atoms, and x is 5–11.

3. Compound according to claim 1, wherein R is selected from the group consisting of hydrogen, alkoxy-carbonyl of two to three carbon atoms, and alkylcarbonyl of two to three carbon atoms, R' is selected from the group consisting of hydrogen and methyl, and x is 5–11.

4. Compound according to claim 1 wherein such compound is 2-ethoxy-carbonylamino-3-(ω-cyano-pentyl)-carbamyl-benzimidazole of the formula

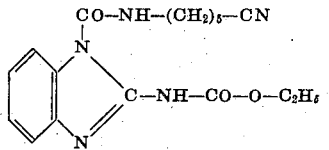

5. Compound according to claim 1 wherein such compound is 2-ethoxy-carbonylamino-3-(ω-cyano-undecyl)-carbamyl-benzimidazole of the formula

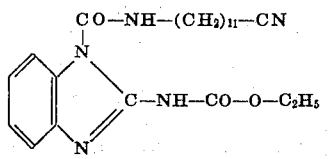

6. Compound according to claim 1 wherein such compound is 2-methoxy-carbonylamino-3-(ω-cyano-pentyl)-carbamyl-benzimidazole of the formula

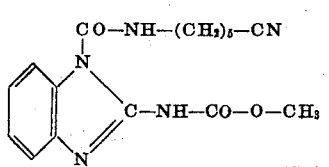

7. Compound according to claim 1 wherein such compound is 2-methoxy-carbonylamino-3-(ω-cyano-pentyl)-carbamyl-5-methyl-benzimidazole of the formula

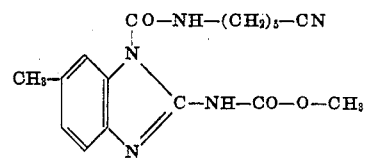

8. Compound according to claim 1 wherein such compound is 2-methoxy-carbonylamino-3-(ω-cyano-pentyl)-carbonyl-6-methyl-benzimidazole of the formula

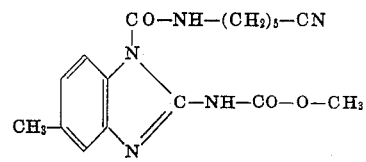

9. Compound according to claim 1 wherein such compound is 2-propionyl-amino-3-(ω-cyano-pentyl)-carbamyl-benzimidazole of the formula

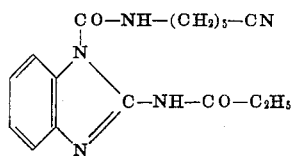

10. Compound according to claim 1 wherein such compound is 1-(ω-cyano-pentyl)-carbamyl-2-amino-benzimidazole of the formula

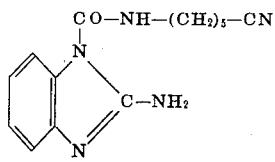

11. Compound according to claim 1 wherein such compound is 2-amino-3-(ω-cyano-pentyl)-carbamyl-6-methyl-benzimidazole of the formula

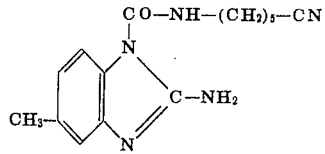

* * * * *

UNITED STATES PATENT OFFICE
CERTIFICATE OF CORRECTION

Patent No. 3,673,210　　　　　Dated June 27, 1972

Inventor(s) Werner Daum et al.

It is certified that error appears in the above-identified patent and that said Letters Patent are hereby corrected as shown below:

Column 7, line 15, "con-template" should read -- contemplate --. Column 15, line 27, "untrea ted" should read -- untreated --. Column 17, line 28, after "C" insert -- = --. Column 20, line 12, "107" should read -- $\omega$ --.

Signed and sealed this 14th day of November 1972.

(SEAL)
Attest:

EDWARD M. FLETCHER, JR.　　　　　ROBERT GOTTSCHALK
Attesting Officer　　　　　　　　　Commissioner of Patents